July 4, 1939.   H. A. BERLINER   2,164,490
VARIABLE PITCH PROPELLER
Filed Dec. 3, 1936
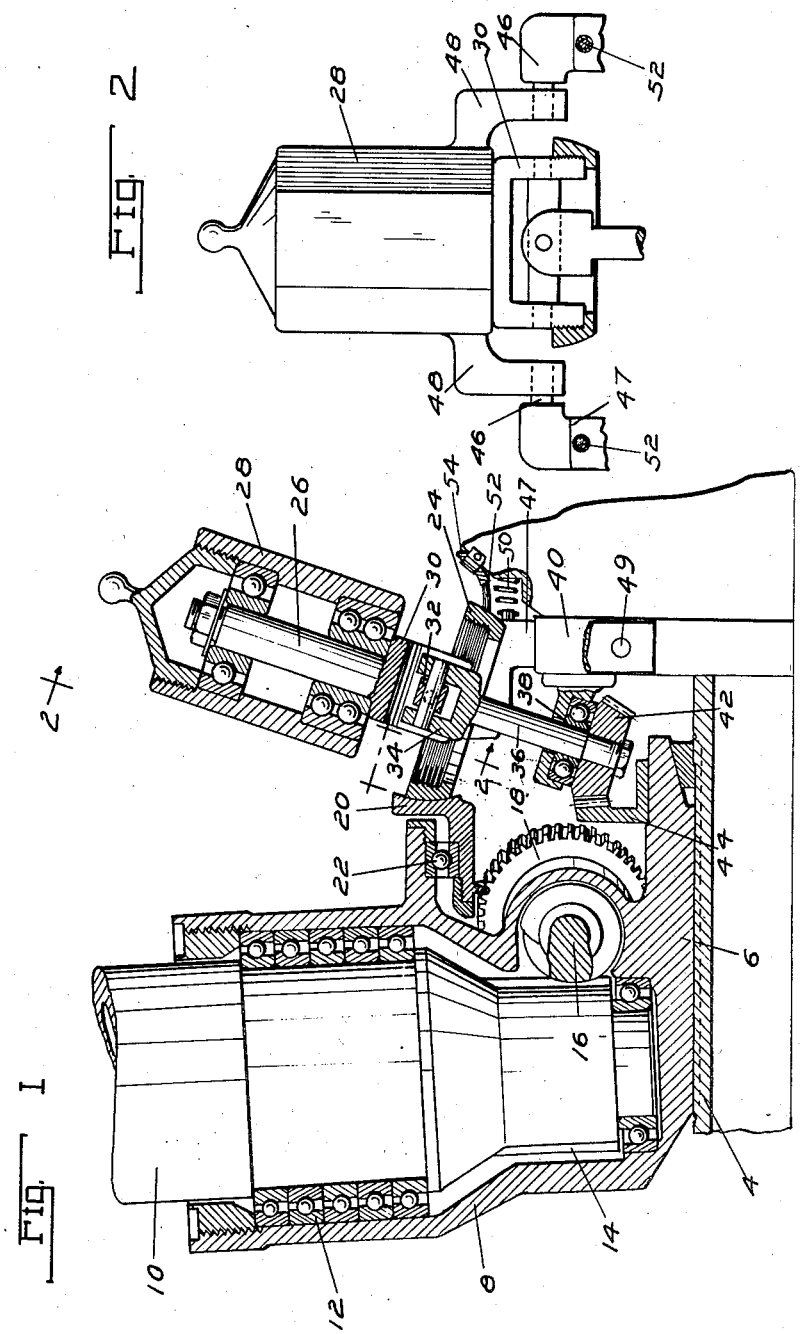
INVENTOR.
HENRY A. BERLINER
BY
McConkey & Booth
ATTORNEYS Patented July 4, 1939

2,164,490

UNITED STATES PATENT OFFICE 2,164,490

VARIABLE PITCH PROPELLER

Henry A. Berliner, Washington, D. C., assignor, by mesne assignments, to Engineering and Research Corporation, Riverdale, Md., a corporation of Maryland Application December 3, 1936, Serial No. 113,964

8 Claims. (Cl. 170—163)

This invention relates to variable pitch propellers and more particularly to novel mechanism for changing the pitch thereof.

One of the objects of the invention is to provide a propeller in which the pitch is changed mechanically by an extremely simple but positive and efficient pitch changing mechanism.

Another object of the invention is to provide novel pitch changing mechanism for a variable pitch propeller which is operated from the propeller shaft, which involves a minimum number of moving parts and which provides an extremely flexible control.

One propeller embodying the invention includes a ring gear surrounding and driven by the propeller shaft and driving a bevel pinion. The pinion is rigidly connected to a shaft which lies substantially transverse to the propeller shaft and which is connected through a universal joint to a traction roller. A bearing member pivotal about an axis concentric with the universal joint supports a shaft which carries the roller so that the roller can be adjusted. The roller drivably engages a disc rotatable about the propeller shaft and connected to a worm which meshes with teeth on the propeller blade. Normally the roller drives the ring at the same speed as the propeller shaft but to change the pitch the roller is adjusted to turn the ring either faster or slower than the shaft to turn the worm and rotate the propeller blade about its own axis.

Other objects, advantages and novel features of the invention will be apparent from the following description of the embodiment illustrated in the accompanying drawing, in which:

Figure 1 is a central section with parts in elevation of a propeller embodying the invention; and Figure 2 is a view substantially on the line 2—2 of Figure 1.

The invention is illustrated as embodied in an aircraft propeller including a propeller shaft 4 carrying a hub 6 which is formed with a plurality of radial sockets 8. A blade 10 is journaled in each of the sockets 8 on bearings 12 and has its root end formed with gear teeth 14 meshing with a worm 16 which is rotatably mounted in the hub 6. A worm gear 18 is secured to each worm 16 and is adapted to be driven by a spiral tooth or a set of spiral teeth on a ring or disc 20 which is mounted on bearings 22 for rotation about the axis of the propeller shaft. The mechanism so far described is substantially similar to that more particularly described in my copending application Serial No. 92,823, filed July 27, 1936, but it will be apparent that some other mechanism could be substituted if desired to connect the blade to the ring 20.

The ring 20 is formed with a parti-toroidal surface for driving engagement with a traction roller 24 which is rigidly secured to a shaft 26 journaled in a bearing member 28. The radially inner end of the shaft 26 carries a bifurcated yoke 30 forming a part of a gimbal type universal joint which includes a block 32 pivoted to the yoke 30 and a similar yoke 34. The yoke 34 is carried by a shaft 36 supported by a bearing 38 mounted on a fixed part 40 such as the engine housing. A bevel pinion 42 is secured to the shaft 36 and meshes with a ring gear 44 which is rigidly secured to the hub 6 to rotate therewith and with the propeller shaft 4.

In order to adjust the roller 24 thereby to change its point of engagement with the ring 20 to vary the driving ratio, the bearing member 28 is pivotally mounted on a pair of pivots 46 by means of bracket extensions 48. Preferably the pivots 46 are coaxial with the center axis of the universal joint so that the bearing member 28 can be moved without affecting the shaft 36. It will be apparent that movement of the member 28 about the pivots 46 will change the point of engagement of the roller 24 with the disc 20 to change the driving ratio therebetween, adjustment of the member 28 being effected either manually or automatically, as disclosed and claimed more particularly in my application Serial No. 92,823 referred to above.

The pivots 46 are carried by arms 47 pivotally mounted on a relatively stationary part of the engine or aircraft frame at 49 and compression springs 50 are mounted between said stationary part and the arms 47. These springs serve to maintain a constant pressure between the rollers 24 and disc 20 to keep them in frictional driving engagement at all times.

In order to disconnect the driving mechanism for changing the blade pitch, the arms 47 are connected to cables 52 which extend through conduits 54 to the pilots cockpit. The cables may be connected to a single operating lever or control by means of which the pilot may rock the arms 47 on their pivots against the force of springs 50 to move the roller 24 out of contact with the disc 20. Thus all driving force is removed and the mechanism will turn idly until the force on the cables 52 is removed so that the springs 50 can move the roller 24 back into contact with the disc 20. Rotation of the blades during disengagement of the roller from the disc can be prevented by designing the worm 16 to be non-reversing or, if desired, a locking mechanism can be provided as shown in my copending application Serial No. 92,823.

The gears 42 and 44 and the roller 24 are so proportioned that in operation the disc 20 will normally be driven in the same direction and at the same speed as the propeller shaft. Thus there will be no rotation of the worm 16 and the blade 10 will remain at constant pitch. If the member 28 is moved clockwise the point of engagement of the roller 24 with the disc 20 will move radially outward to reduce the driving ratio so that the disc will rotate slower than the propeller shaft. Thus there will be relative movement between the gear 18 and the ring 20 to turn the gear and the worm 16 thereby turning the blade in its socket, the speed at which the blade is turned being governed by the amount of movement of the member 28 from normal. When the blade has reached the desired new pitch, the member 28 is moved back to its normal position thereby stopping further rotation of the blade. To rotate the blade in the opposite direction for changing the pitch in the opposite sense, the member 28 is moved counterclockwise, thereby causing the ring 20 to be driven faster than the propeller blade.

It will be understood that the invention can be applied to a propeller having two, three or even more blades and that all of the blades will be adjusted simultaneously by the same ring 20. Various other modifications might also be made, and it is accordingly not intended that the scope of the invention shall be limited to the form shown or otherwise than by the terms of the appended claims.

What is claimed is:

1. In a variable pitch propeller having a propeller shaft and a blade, pitch changing mechanism comprising a ring gear driven by the propeller shaft, a pinion meshing with said ring gear and driven thereby, a shaft secured to said pinion, a fixed bearing supporting said shaft, a universal joint driven by said shaft, a traction roller driven by said universal joint, an annular disc surrounding the propeller shaft and having toroidal surface engaging the edge of said roller, a worm engaging the propeller blade, means connecting said worm to said disc to be driven thereby, and means to adjust said roller thereby to change the angle of the blade.

2. In a variable pitch propeller having a propeller shaft and a blade, pitch changing mechanism comprising an annular disc surrounding the propeller shaft and drivably connected to the propeller blade, a traction roller having its edge engaging said disc, means supporting said roller for rotation about its axis, said means being adjustable to vary the point of engagement of the roller with the disc, an annular driving element surrounding and secured to the shaft, and a second shaft operable from said element and adjustably connected to said roller for driving the same, said adjustable connection being rigid in torsion but adjustable to permit adjustment of the roller.

3. In a variable pitch propeller having a propeller shaft and a blade, pitch changing mechanism comprising an annular disc surrounding the propeller shaft and drivably connected to the propeller blade, a traction roller having its edge engaging said disc, a shaft rigidly connected to said roller and supporting the same, means including a bearing for supporting said shaft and roller, said means being adjustable to vary the point of engagement of the roller with the disc, an annular driving element surrounding and secured to the shaft, and means operable from said element to drive said shaft and roller.

4. In a variable pitch propeller having a propeller shaft and a blade, pitch changing mechanism comprising an annular disc surrounding the propeller shaft and drivably connected to the propeller blade, a traction roller having its edge engaging said disc, means supporting said roller for rotation about its axis, said means being adjustable to vary the point of engagement of the roller with the disc, and means operable from the propeller shaft for driving said roller, a shaft rigidly secured to and supporting said roller, a bearing assembly for rotatably supporting said shaft, a second shaft driven from the propeller shaft, a universal joint connecting the second shaft to said first named shaft, and a pivotal mounting for said bearing assembly coaxial with said universal joint.

5. In a variable pitch propeller having a shaft and a blade, pitch changing mechanism comprising an annular disc surrounding the propeller shaft and drivably connected to the blade, a traction roller having its edge drivably engaging said disc, means supporting said roller for rotation about its axis, said means being adjustable to vary the point of engagement of the roller with the disc and to move the roller into and out of engagement with the disc, means yieldingly urging said supporting means toward the disc to press the edge of the roller into driving engagement therewith, means operable at will to move the supporting means away from the disc to relieve the driving pressure between the disc and roller, and means operable from the propeller shaft to drive the roller.

6. In a variable pitch propeller having a propeller shaft and a blade adjustably carried thereby, pitch changing mechanism comprising an annular disc rotatably surrounding the propeller shaft and having a driving surface formed on one of its faces, means connecting said disc to the blade, an annular driving element surrounding and secured to the shaft, a second shaft drivably connected to said element and extending outwardly from the propeller shaft, a roller having its edge drivably engaging said driving surface, means for adjusting said roller to vary its point of engagement with the driving surface, and means forming an adjustable driving connection between the roller and said second shaft.

7. In a variable pitch propeller having a propeller shaft and a blade adjustably carried thereby, pitch changing mechanism comprising an annular disc rotatably surrounding the propeller shaft and having a driving surface formed on one of its faces, means connecting said disc to the blade, an annular gear surrounding and secured to the propeller shaft, a second shaft extending outwardly from the propeller shaft and carrying a pinion meshing with said gear, a roller having its edge drivably engaging said driving surface, means for adjusting said roller to vary its point of engagement with the driving surface, and means forming an adjustable driving connection between the roller and said second shaft.

8. In a variable pitch propeller having a propeller shaft and a blade adjustably carried thereby, pitch changing mechanism comprising an annular disc rotatably surrounding the propeller shaft and having a driving surface formed on one of its faces, means connecting said disc to the blade, a driving roller having its edge drivably engaging said driving surface, a second shaft extending outwardly from the propeller shaft, an annular gear secured to the propeller shaft for driving said second shaft, means adjustably mounting the roller for movement into and out of engagement with the driving surface and for varying its point of engagement with the driving surface, means yieldingly urging said last named means in a direction to move the roller into driving engagement with the driving surface, manually controllable means to move the roller out of engagement with the driving surface, and means forming an adjustable driving connection between the roller and said second shaft.

HENRY A. BERLINER.